(12) United States Patent
Gundogan et al.

(10) Patent No.: US 7,612,288 B1
(45) Date of Patent: Nov. 3, 2009

(54) TECHNIQUES FOR ATTACHING A LABEL TO AN ELECTRONIC CABLE

(75) Inventors: Ilhan Gundogan, Lexington, MA (US); William Brian Cunningham, Westborough, MA (US); Jeffrey Michael Lewis, Maynard, MA (US); Gerald J. Cote, Upton, MA (US); Lawrence J. Feroli, W. Townsend, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 11/965,429

(22) Filed: Dec. 27, 2007

(51) Int. Cl.
*H01B 7/36* (2006.01)
(52) U.S. Cl. .................................................. 174/112
(58) Field of Classification Search .................... 174/92, 174/112
See application file for complete search history.

(56) References Cited

U.S. PATENT DOCUMENTS

| 4,596,072 | A | 6/1986 | Shields |
| 4,835,890 | A | 6/1989 | Nelson et al. |
| 5,347,084 | A * | 9/1994 | Roney et al. .................. 174/92 |
| 5,658,648 | A | 8/1997 | Doerr et al. |
| 6,777,618 | B2 * | 8/2004 | Bond et al. ................. 174/112 |
| 7,052,196 | B2 | 5/2006 | Ueno et al. |

FOREIGN PATENT DOCUMENTS

| EP | 439940 | * | 8/1991 |
| WO | WO 93/04489 | * | 3/1993 |

* cited by examiner

*Primary Examiner*—Chau N Nguyen
(74) *Attorney, Agent, or Firm*—BainwoodHuang (57) ABSTRACT

A cable assembly has an electronic cable (e.g., a data communications cable, a power cable, a fiber optic cable, a cable concurrently providing both data and power, etc.), a label to provide identification to the electronic cable, and a label supporter. The label supporter includes a cable section arranged to attach to the electronic cable, and a label section coupled to the cable section. The label section defines a rigid label surface which concurrently (i) overlays a portion of an outer surface of the electronic cable at a predefined distance from the outer surface of the electronic cable and (ii) supports the label at the predefined distance from the outer surface of the electronic cable when the cable section attaches to the electronic cable.

20 Claims, 10 Drawing Sheets

TECHNIQUES FOR ATTACHING A LABEL TO AN ELECTRONIC CABLE

BACKGROUND

A conventional cable labeling system includes a cable and a label which directly adheres to the cable. Typically, the back of the label is pre-coated with an adhesive. As a result, a user is able to peel off the label from a plastic coated sheet (or print such a label from a dispenser) and press the label onto the outer surface of the cable, i.e., directly onto the cable insulation. As a result, the label sticks to the cable.

Such cable labeling is common in certain electronic equipment settings. In such a setting, the user typically plugs the end of the cable into a cable port, and fastens the label near an end of the cable to mark the cable as belonging to that cable port. Accordingly, the user is able to properly identify the cable as the particular cable which is supposed to connect to that particular cable port. As a result, if the cable were ever temporarily disconnected from the cable port, the user is able to identify that cable perhaps among other similar cables for subsequent reconnection to that cable port. Moreover, there is no need to trace the cable back to its other connection location for proper identification thus saving the user time and effort, e.g., in some situations the other end of the cable may connect to a device in an adjacent cabinet or to a device at a remote location separated by a wire-way making the cable difficult to follow.

In a high density cable application (e.g., at an I/O interface to a data storage array, at a network patch panel, etc.), many cables may run in the same direction and connect to an array of ports on a device in a relatively tight space. In such an application, labels on the cables enable the user to distinguish the many cables from each other. Accordingly, if the user needs to quickly find a particular cable among the many cables (e.g., to temporarily disconnect or replace a cable), the user is able to conveniently navigate among the many cables based on the labels.

SUMMARY

Unfortunately, there are deficiencies to the above-described conventional cable labeling approach in which a user directly adheres a label onto the outer surface of a cable. For example, the contour of the cable surface typically has a sharp radius of curvature. Such a radius often promotes detachment of the label from the cable surface particularly if the adhesive on the back of the label is weak or contaminated. As a result, the label may fall off the cable or perhaps inadvertently attach to a second cable thus wrongly labeling that second cable.

Additionally, direct attachment of the label to the cable surface results in the label residing on a fixed location on the cable surface. If the fixed location is not ideal, such attachment may prevent the user from properly viewing the label without rotating the cable. Unfortunately, if the user rotates the cable, the user increases the risk of disconnecting or even damaging the cable.

Furthermore, such direct attachment encourages users to twist the cable to get a better viewing angle. Ideally cables should not be twisted since even a minor twist could result in disruption of communications passing through the cable (e.g., high speed electrical signals, fiber optic signals, etc.) and/or cause data loss.

In contrast to the above-described conventional cable labeling approach in which a user directly adheres a label onto the outer surface of a cable, improved techniques involve utilization of a separate label supporter which attaches to an electronic cable. Such a supporter supports a label and alleviates the need to rotate or twist the electronic cable to properly view the label. Rather, the user is able to simply maneuver the supporter, not the cable, to improve the viewing angle. Moreover, such a supporter is capable of providing a rigid label surface which is flatter than the radius of the electronic cable thus reducing the likelihood of inadvertent label detachment.

One embodiment is directed to a cable assembly having an electronic cable (e.g., a data communications cable, a power cable, a fiber optic cable, a cable concurrently providing both data and power, etc.), an adhesive label to provide identification to the electronic cable, and a label supporter. The label supporter includes a cable section arranged to attach to the electronic cable, and a label section coupled to the cable section. The label section defines a rigid label surface which concurrently (i) overlays a portion of an outer surface of the electronic cable at a predefined distance from the outer surface of the electronic cable and (ii) supports the adhesive label at the predefined distance from the outer surface of the electronic cable when the cable section attaches to the electronic cable.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves utilization of a label supporter which attaches to an electronic cable (e.g., a data communications cable). Such a supporter is arranged to support a label and, when in operation, alleviates the need to rotate or twist the electronic cable to properly view the label. Rather, the user is able to simply maneuver the supporter, not the cable, to improve the viewing angle (i.e., there is minimal physical disturbance to the cable). Moreover, such a supporter is capable of providing a rigid label surface which is flatter than the radius of the electronic cable thus reducing the likelihood of inadvertent label detachment.

Figure 1:
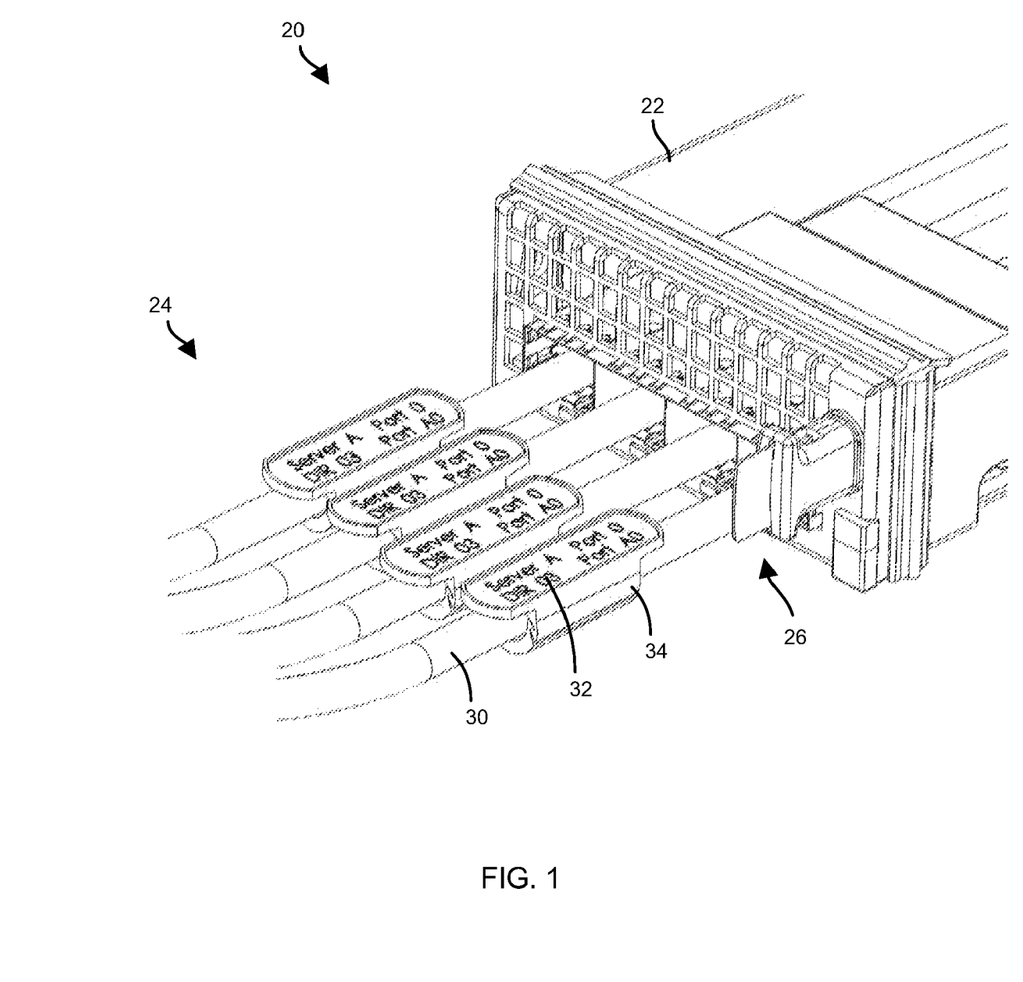
FIG. 1 is a perspective view of a cable labeling system which utilizes a set of label supporters.

FIG. 1 is a perspective view of a cable labeling system 20 which provides improved label support. The cable labeling system 20 includes an electronic device 22, a set of cable assemblies 24 (i.e., one or more cable assemblies 24). The electronic device 22 includes an array of ports (or connectors) 26 which connects to the set of cable assemblies 24 (e.g., a row of ports, rows and columns of ports, etc.). Accordingly, the system 20 is well-suited for a variety of high density applications. For example, the electronic device 22 is capable of being an I/O module which resides in close proximity to other I/O modules thus forming a high density connection interface of a data storage system or a network system, among others things.

Each cable assembly 24 includes an electronic cable 30 (e.g., a fiber optic cable, a LAN cable, etc.), an adhesive label 32 and a label supporter 34. In some arrangements, the electronic cable 30 is arranged to carry high speed data signals (i.e., one or more electrical signals, one or more fiber optic signals, etc.). In some applications, the electronic cable 30 may even be sensitive to significant movement (e.g., twisting). Advantageously, the label supporter 34 alleviates the need to substantially disturb the electronic cable 30.

During operation, the electronic cables 30 are arranged to connect to the array of ports 26 of the electronic device 22. Although the electronic cables 30 are shown neatly arranged in FIG. 1, the opportunity may exist for the electronic cables 30 to be positioned in a more confusing manner (e.g., bundled together, tangled or crossing each other, etc.). Nevertheless, the label supporters 34 robustly and reliably attach to their respective electronic cables 30, and display respective adhesive labels 32 to competently and dependably identify the cables 30 for efficient and effective cable management.

In some arrangements, the labels 32 uniquely identify the cables 30 among each other. In other arrangements, the labels 32 uniquely identify the particular electronic device 22 among other electronic devices 22. A variety of other types of information may be included on the labels 32 as well. Further details of a first embodiment will now be provided with reference to FIGS. 2 through 4.

Figure 2:
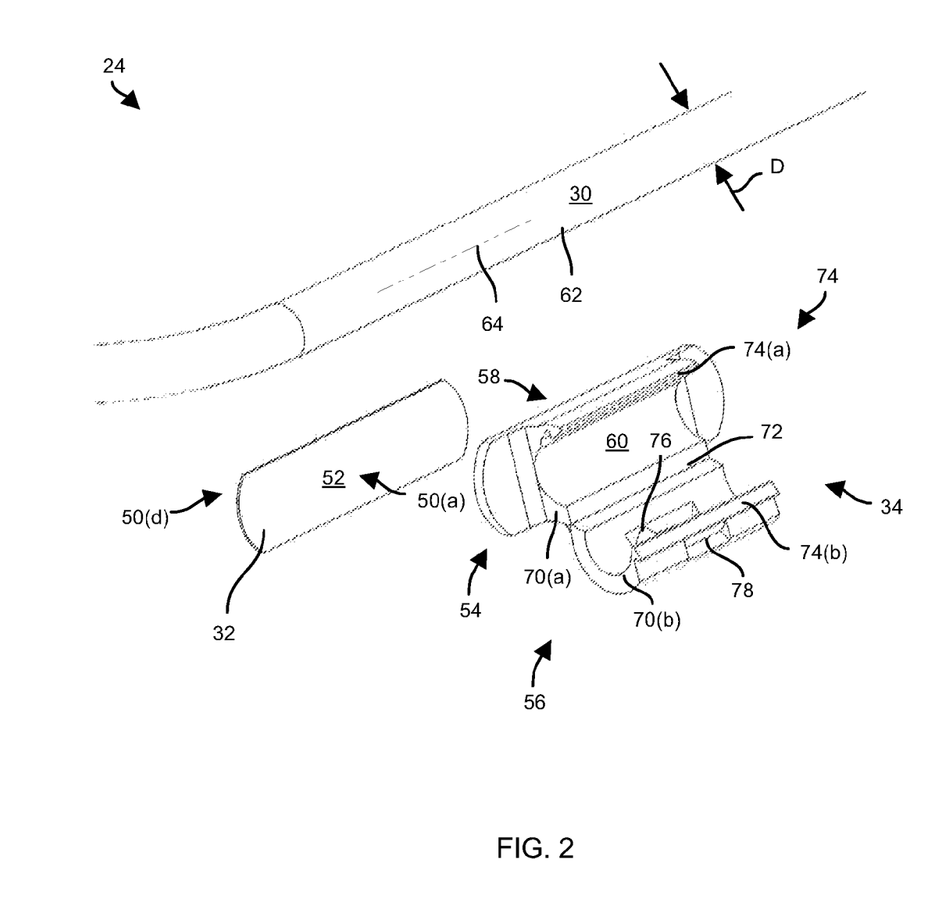
FIG. 2 is an exploded view of a cable assembly of the cable labeling system of FIG. 1 in accordance with a first embodiment.
Figure 2A:
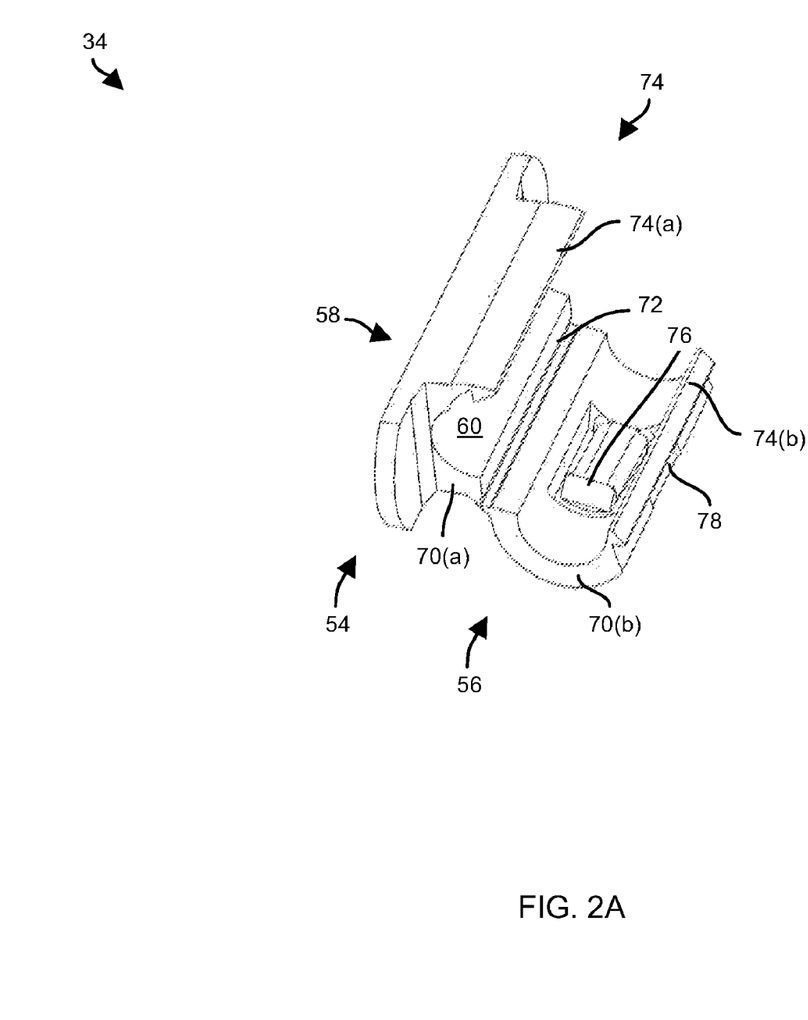
FIG. 2A is a view of a label supporter of the cable assembly of FIG. 2 from a slightly different angle.
Figure 3:
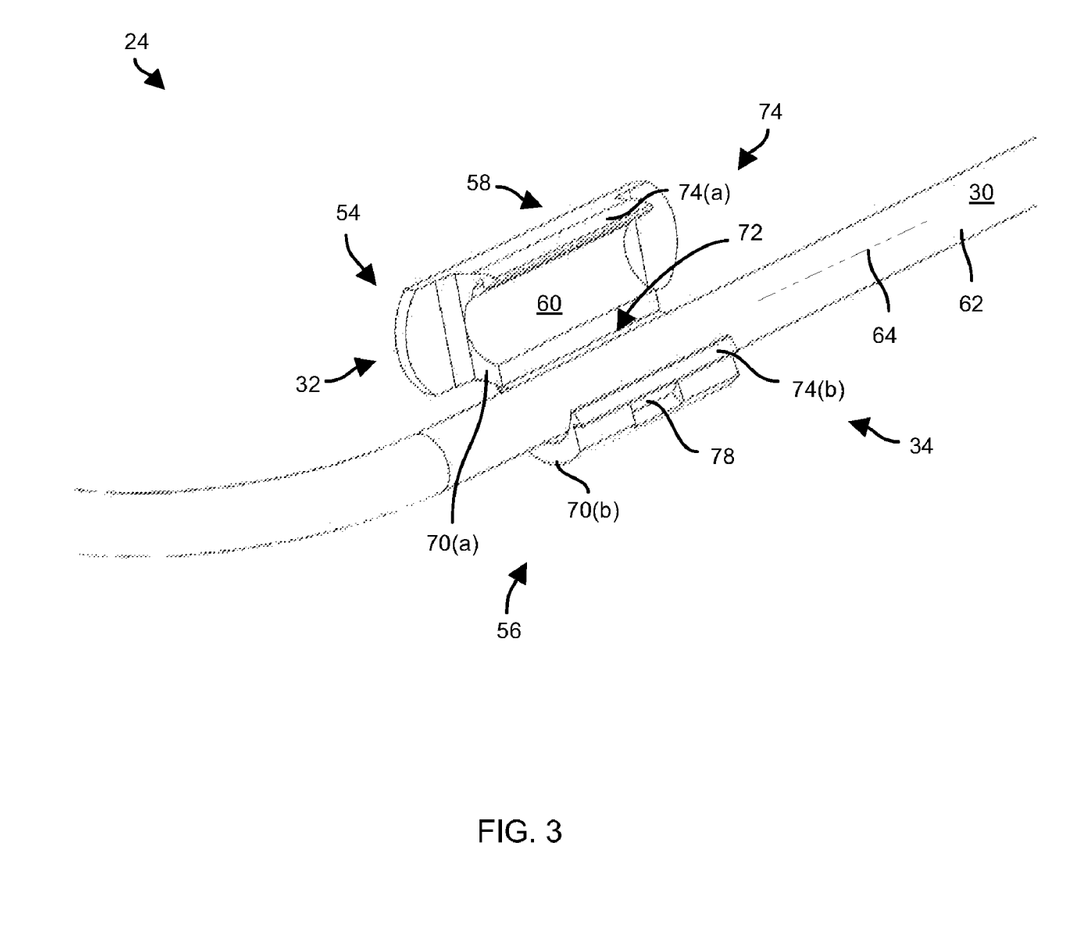
FIG. 3 is a partially assembled view of the cable assembly of FIG. 2 in accordance with the first embodiment.
Figure 4:
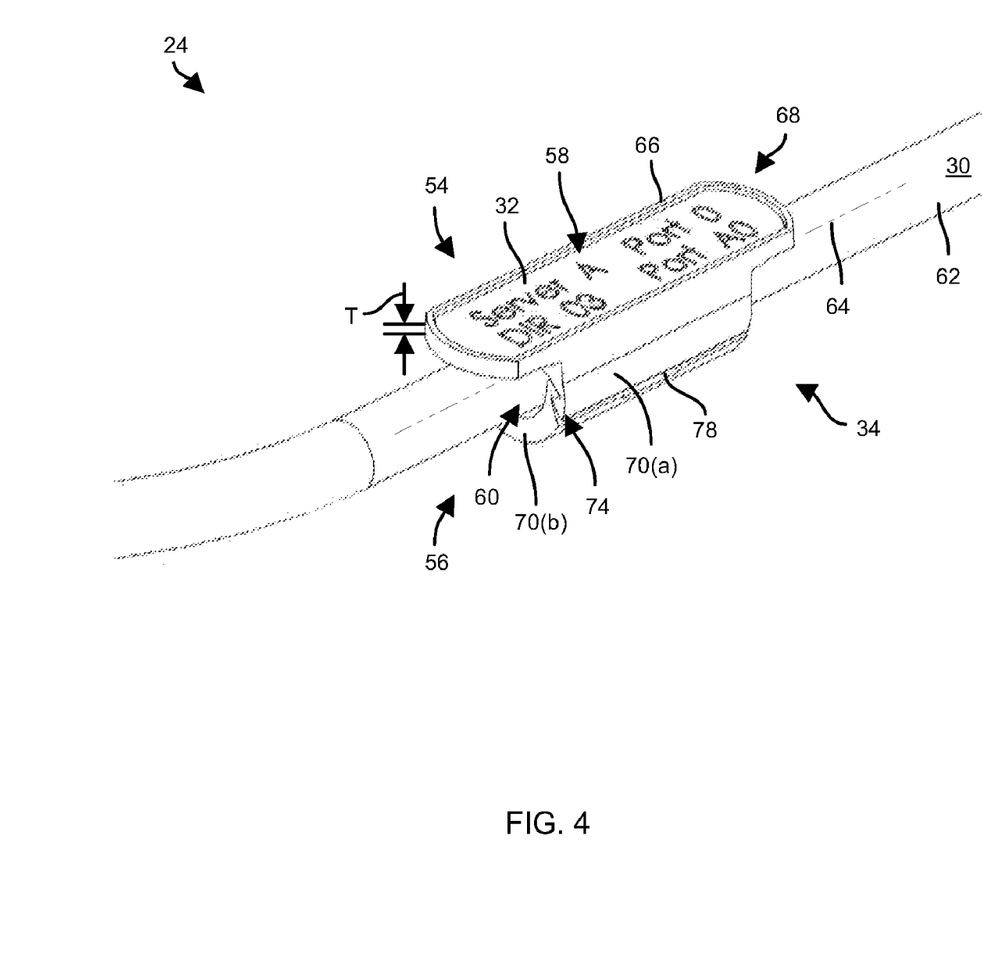
FIG. 4 is a fully assembled view of the cable assembly of FIG. 2 in accordance with the first embodiment.

FIGS. 2 through 4 show an installation sequence for an embodiment of the cable assembly 24. FIG. 2 shows an exploded view of the cable assembly 24. FIG. 2A is a view of the label supporter 34 from a slightly different angle. FIG. 3 shows a partially assembled view of the cable assembly 24. FIG. 4 shows a fully assembled view of the cable assembly 24.

As best seen in FIG. 2, the label 32 has a display side 50(*d*) and an attachment side 50(*a*). The display side 50(*d*) of the label 32 is configured to provide readable information (e.g., text, numbers, symbols, barcodes, etc.) to a user. The attachment side 50(*a*) preferably includes an adhesive 52 which is able to reliably secure the label 32 to the label supporter 34.

The label supporter 34 includes a label section 54 and a cable section 56. The label section 54 defines a rigid label surface 58 which is arranged to support the label 32. The cable section 56 is arranged to attach the label supporter 34 to the electronic cable 30. As best seen in series from FIG. 2 to FIG. 4, the cable section 56 defines cable contact surface 60 which substantially mirrors the outer surface 62 (i.e., the outer surface cable radius) of the electronic cable 30. In contrast, the rigid label surface 58 defined by the label section 54 is flatter than the radius of the cable contact surface 60 as well as the radius of the outer surface 62 of the cable 30. In some arrangements, the rigid label surface 58 defined by the label section 54 is substantially flat thus being capable of holding the label 32 substantially in a two-dimensional plane. In other arrangements, the rigid label surface 58 is not flat but curved slightly, i.e., the rigid label surface 58 has a label section radius which is larger than the cable section radius. Such features result in less likelihood of label detachment due to weak adhesive or an excessively stiff label.

When the label support 34 fastens to the electronic cable 30 (FIG. 4), the rigid label surface 58 overlays the outer surface 62 of the cable 30 at a predefined distance (T) from the outer surface 62. As best seen in FIG. 4, this predefined distance is capable of being the thickness of the label section 54.

In some arrangements, the shape of the rigid label surface 58 is purposefully elongated and extends in the same direction as an axis 64 of the cable 30. Accordingly, the label 32 residing on the rigid label surface 58 remains angularly oriented along the cable 30 as if it attached directly to the cable 30 thus providing a minimal profile. As a result, if the cable 30 is moved relative to other cables 30 or if the cable 30 is snaked through a narrow space (e.g., during cable installation or replacement, etc.), there is less likelihood of any interference. That is, it is less likely that the label supporter 34 will get caught or snagged than if the rigid label surface 58 were disposed relative to the cable section 56 in a different manner.

In some arrangements, the rigid label surface 58 defined by the label section 54 has a height (i.e., the direction perpendicular to the cable axis 64) which is greater than a diameter (D) (see FIG. 2) of the cable 30 and a width (i.e., the direction of the cable axis 64) which is substantially greater than the height. Such a geometry provides abundant surface area for the label 32 (e.g., use of a relatively large label 32) while still maintaining the label 32 in a substantially streamline orientation relative to the cable 30.

In some arrangements, the label section 54 further defines a lip 66 which extends substantially around a periphery 68 of the rigid label surface 58 as best seen in FIG. 4. Such a lip 66 provides further protection against inadvertent label detachment. Rather, the lip 66 recesses the label 32. Accordingly, the edges remain clean and the lip 66 provides a barrier which prevents the edges of the label 32 from attaching to other neighboring objects.

In some arrangements, the cable section 56 has two side members 70(*a*) and 70(*b*), a hinge 72, a lock 74 formed by locking features 74(*a*) and 74(*b*), and a protrusion (or tab) 76 (see FIGS. 2 and 2A). The locking features 74(*a*) and 74(*b*) are arranged to engage with and disengage from each other. Accordingly, the cable section 56 is able to reside in an opened state (see FIGS. 2, 2A and 3) and transition to a locked closed state (see FIG. 4). Once the label supporter 34 is locked around the cable 30, the protrusion 76 grabs the cable 30 by applying force against the cable 30 toward the center axis of the cable 30, e.g., see the ramped surface at the end of the protrusion 76 in FIG. 2A. Such operation prevents the label supporter 34 from substantially sliding lengthwise along the cable axis 64. Nevertheless, the label support 34 is preferably able to rotate with less effort around the cable 30 thus alleviating any need to twist the cable 30 if rotating the label supporter 34 to improve viewing orientation.

Additionally, when the cable section 56 is in the locked closed state, the lock 74 is capable of receiving actuation at a predefined slot 78 (e.g., from a screwdriver which disengages the locking features 74(*a*) and 74(*b*)) which unlocks the side members 70(*a*) and 70(*b*) thus allowing the cable section 56 to transition back to the opened state.

To install the label supporter 34 onto the electronic cable 30, a user lays a portion of the cable 30 within the cable section 56 (see FIG. 3). The user then closes the label supporter 34 over the cable 30. In some arrangements, the members 70(a), 70(b) engage in a snap-fit manner thus providing feedback to the user so that the user does not attempt to over-compress or over-squeeze the label supporter 34. In its closed state, the cable section 56 forms a substantially cylindrical structure which encircles the cable 30 for reliable fastening. With the protrusion 76 grabbing the cable 30 to prevent substantial axial displacement and substantial sliding lengthwise of the label supporter 34 along the cable 30, electronic data communications signals are nevertheless allowed to pass through the cable 30 in an unhindered manner.

In some arrangements, the label supporter 34 is formed via an injection molding process. Such a process permits all of the label supporter 34 components (e.g., the hinge 72, the lock 74, the protrusion 76, etc.) to belong to an integrated, unitary body. As a single injection molded plastic part, the label supporter 34 is simple and straight forward for a user to operate. Further details will now be provided with reference to FIGS. 5 through 9.

Figure 5:
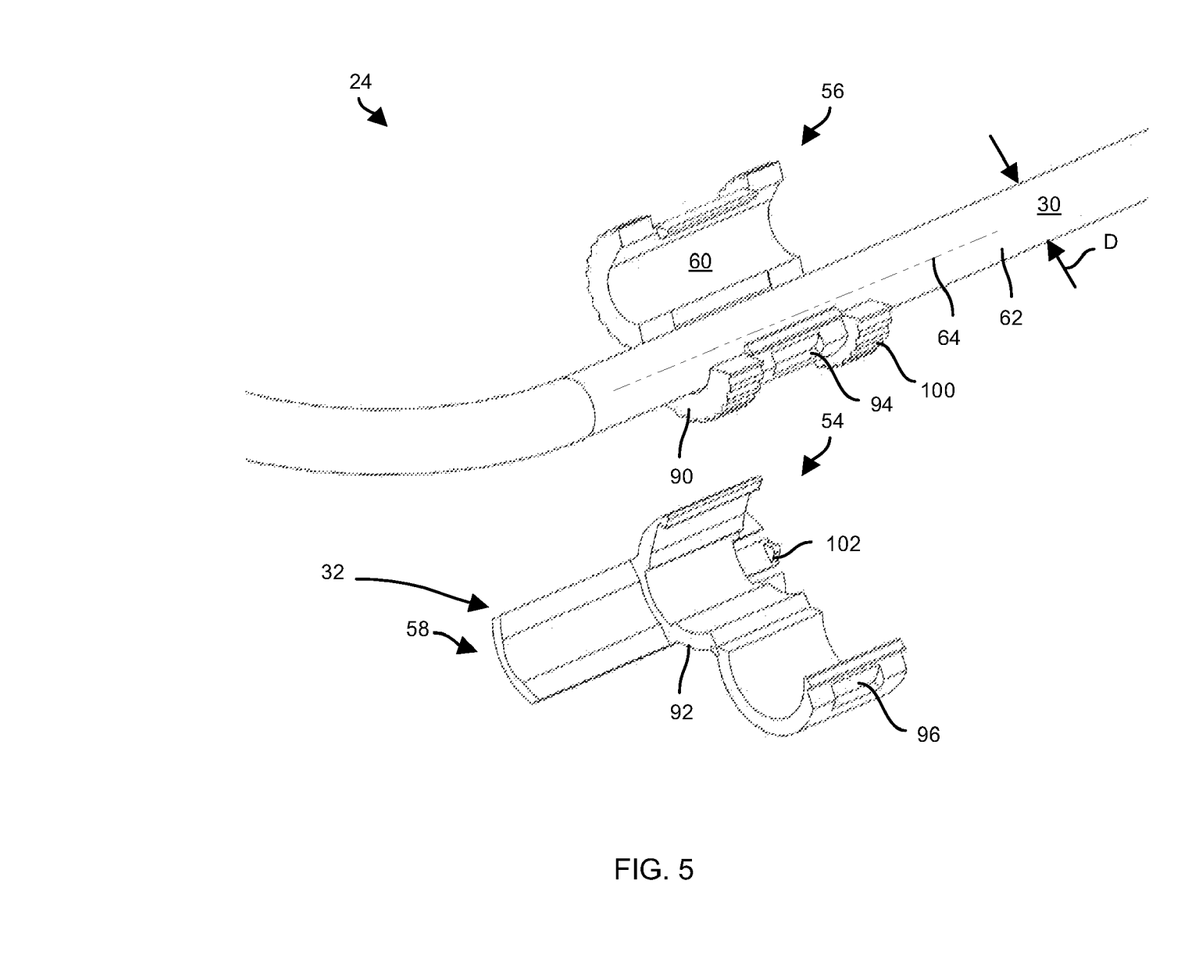
FIG. 5 is a partially assembled view of a cable assembly of the cable labeling system of FIG. 1 in accordance with a second embodiment.
Figure 6:
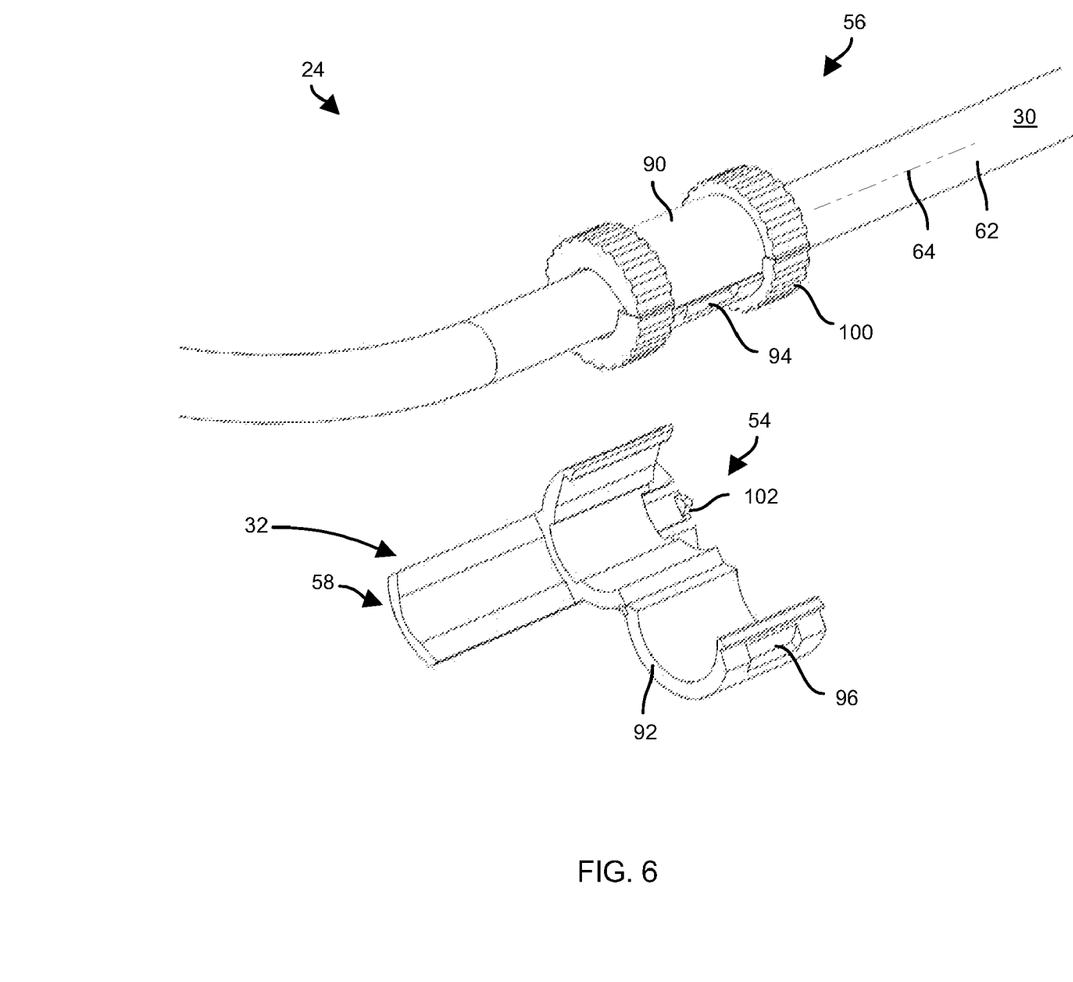
FIG. 6 is another partially assembled view of the cable assembly of FIG. 2 in accordance with the second embodiment.
Figure 7:
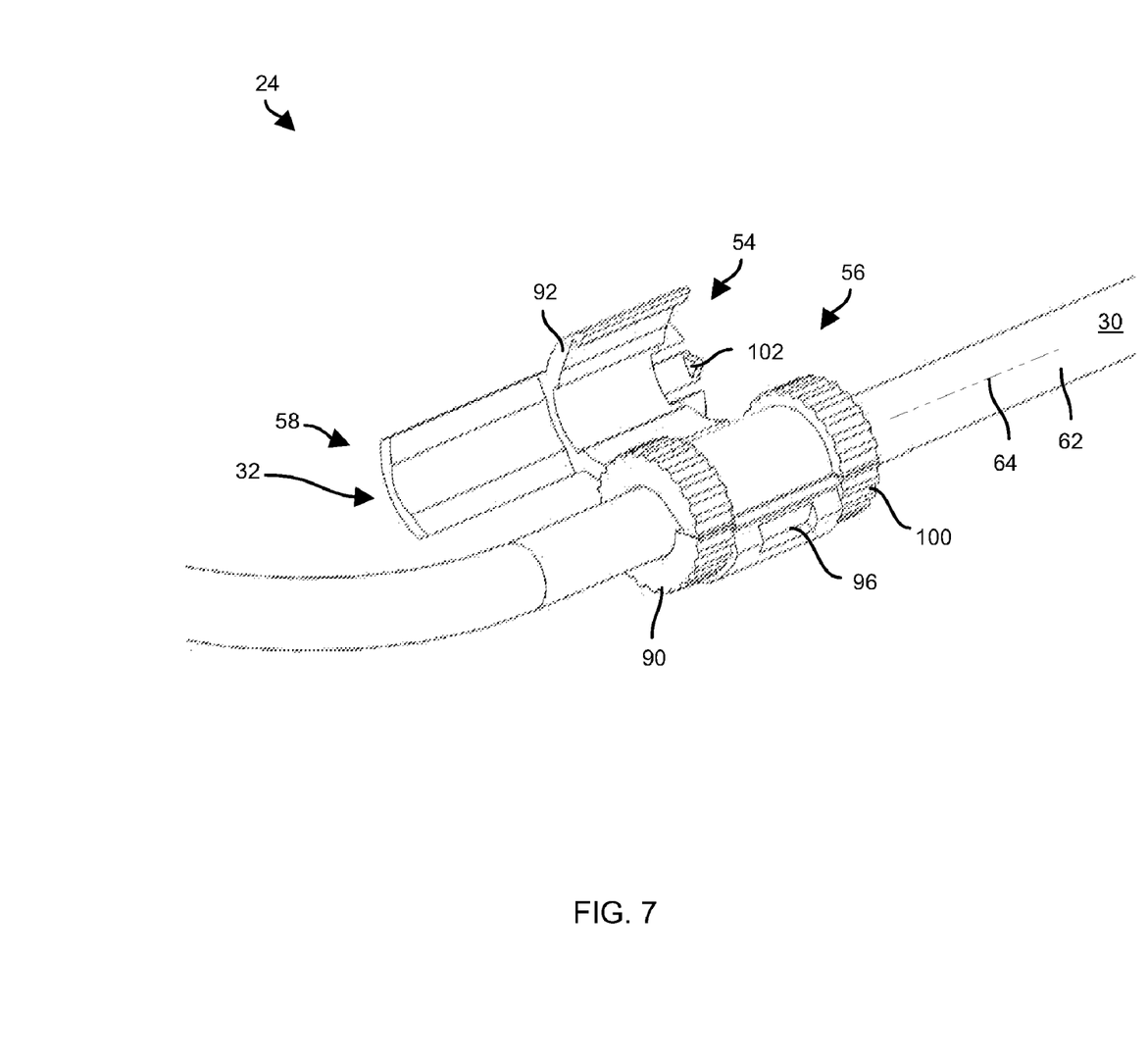
FIG. 7 is yet another partially assembled view of the cable assembly of FIG. 2 in accordance with the second embodiment.
Figure 8:
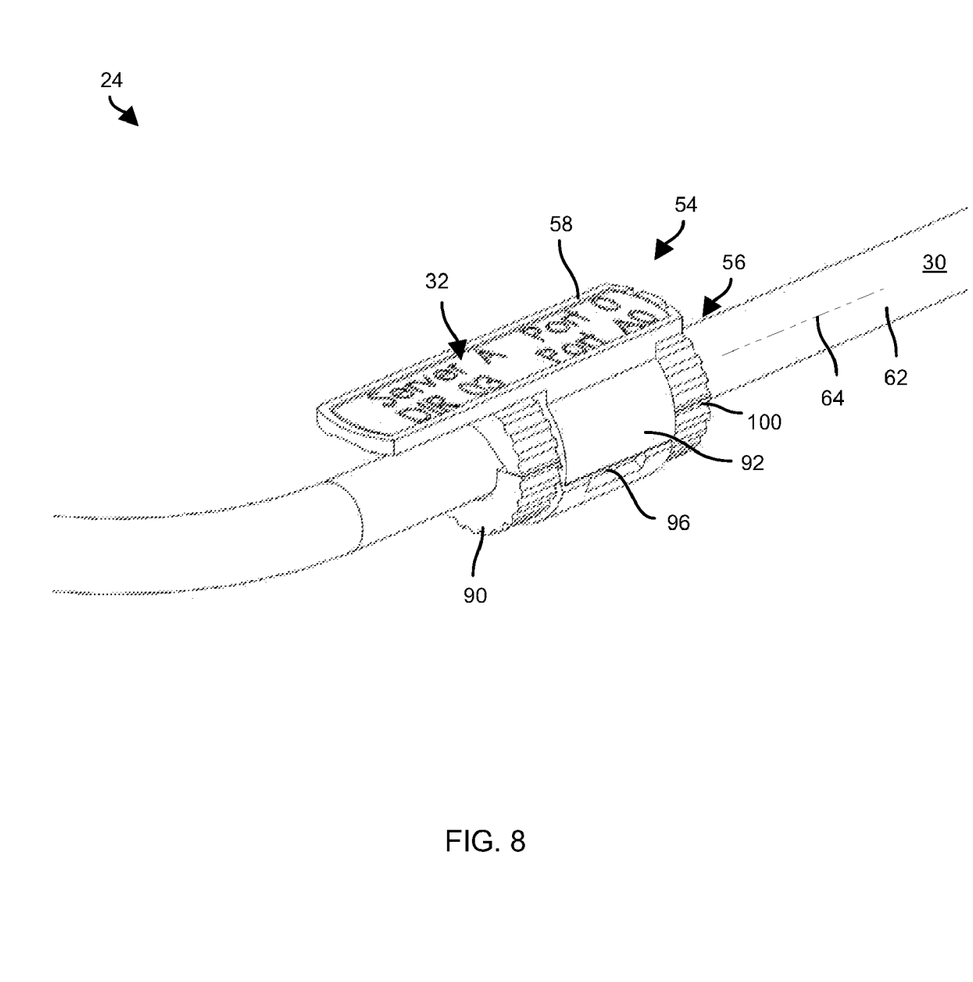
FIG. 8 is a fully assembled view of the cable assembly of FIG. 2 in accordance with the second embodiment.
Figure 9:
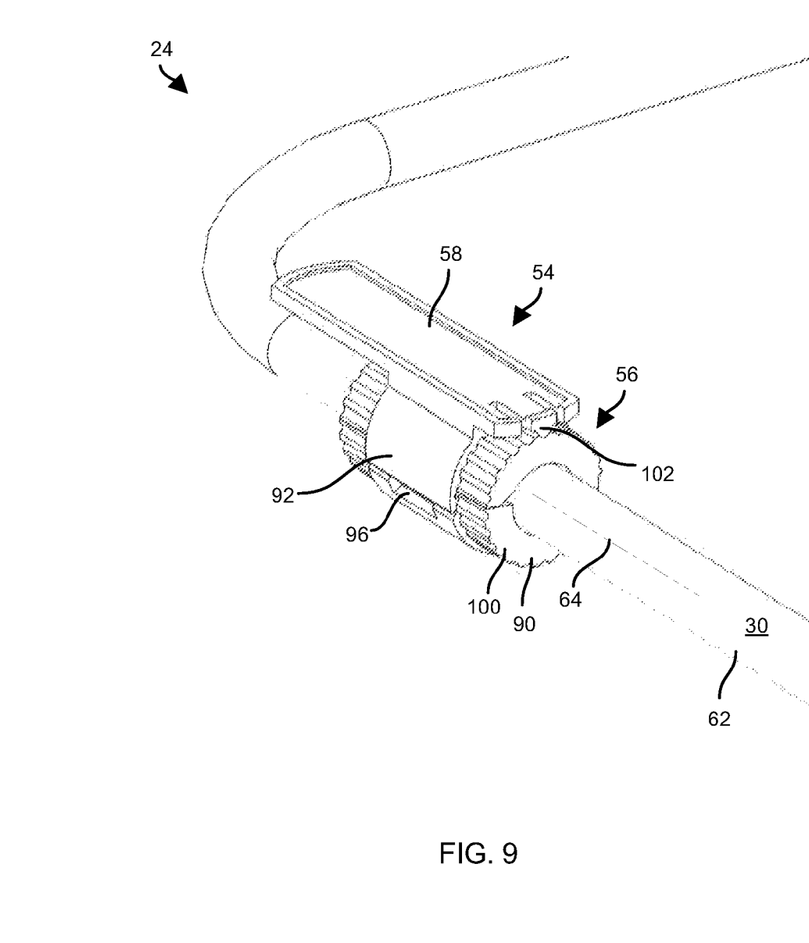
FIG. 9 is a view of part of the cable assembly of FIG. 8 from a reverse angle.

FIGS. 5 through 9 show an installation sequence for another embodiment of the cable assembly 24. FIG. 5 shows an exploded view of the cable assembly 24 in accordance with this second embodiment. FIG. 6 shows a partially assembled view of the cable assembly 24. FIG. 7 shows another partially assembled view of the cable assembly 24. FIG. 8 shows a fully assembled view of the cable assembly 24. FIG. 9 shows the fully assembled cable assembly 24 from a reverse angle.

As shown in FIGS. 5 through 9, the cable section 56 and the label section 54 are separate parts rather than coupled by a hinge. In particular, the cable section 56 includes an inner component 90 which is arranged to fasten to the electronic cable 30 in a substantially stationary manner. Additionally, the label section 54 includes an outer component 92 which is arranged to rotate around the inner component 90 when the inner component 90 is installed around the outer component 92 (FIGS. 8 and 9).

Similarly to the first embodiment of FIGS. 2 through 4, each component 90, 92 possesses a hinge and is able to transition from an opened state to a closed state in a clamshell-style manner and back again, e.g., via screw driver actuation on respective slots 94, 96.

In contrast to the first embodiment, the inner component 90 defines outer ridges 100 which operate to prevent the outer component 92 from sliding off of the inner component 90 in a direction along the cable axis 64. Additionally, the outer ridges 100 remain exposed for use by the outer component 92. Along these lines, the outer component 92 defines a tab 102 which interacts with one of the outer ridges 100 in a ratchet-style manner. In particular, the inner component 90 is now able to remain substantially stationary with respect to the cable 30 (e.g., the inner component 90 does not substantially rotate due to one or more protrusions 76 (also see FIG. 2). Nevertheless, the outer component 92 is able to rotate around the inner component 90 and thus enable a user to rotate the label 32 (FIG. 2) around the cable 30.

The tab 102 facilitates this process by providing a mild holding force to hold the label 32 substantially stationary when the user does not move the outer component 92. However, the tab 102 deflects over the outer ridge 100 in a relatively easy manner so that user rotation of the label 32 and the outer component 92 does not result in substantial cable movement. Additionally, the tab 102 actuation is capable of providing audio feedback (e.g., clicking) to the user when the user rotates the outer component 92 to change the label's angular orientation around the cable 30. Preferably, the label 32 hides the tab 102 thus providing a degree of protection to the tab 102. FIG. 9 shows the label supporter 34 without the label 32 to better illustrate various features of the tab 102 and the outer ridge 100.

As described above, improved techniques involve utilization of a label supporter 34 which attaches to an electronic cable 30. Such a supporter 34 supports a label 32 and alleviates the need to rotate or twist the electronic cable 30 to properly view the label 32. Rather, the user is able to simply maneuver the supporter 34, not the cable 30, to improve the viewing angle. Moreover, such a supporter 34 is capable of providing a rigid label surface 58 which is flatter than the radius of the electronic cable 30 thus reducing the likelihood of inadvertent label detachment.

While various embodiments of the invention have been particularly shown and described, it will be understood by those skilled in the art that various changes in form and details may be made therein without departing from the spirit and scope of the invention as defined by the appended claims.

For example, it should be understood that the label 32 can be adhered to the rigid label surface 58 of the label supporter 34 before installing the label supporter 34 onto the electronic cable 30. Alternatively, the label 2 can be adhered to the rigid label surface 58 of the label supporter 34 after installing the label supporter 34 onto the electronic cable 30.

What is claimed is:

1. A cable assembly, comprising:
   an electronic cable;
   a label to provide identification to the electronic cable; and
   a label supporter having:
      a cable section arranged to attach to the electronic cable, and
      a label section arranged to interact with the cable section, the label section defining a rigid label surface which concurrently (i) overlays a portion of an outer surface of the electronic cable at a predefined distance from the outer surface of the electronic cable and (ii) supports the label at the predefined distance from the outer surface of the electronic cable when the cable section attaches to the electronic cable;
   wherein the cable section includes an inner component which is arranged to fasten to the electronic cable in a substantially stationary manner when the cable section attaches to the electronic cable; and
   wherein the label section includes an outer component which is arranged to rotate around the inner component when the outer component is installed around the inner component and when the cable section attaches to the electronic cable.

2. A cable assembly as in claim 1 wherein the cable section defines a cable contact surface which contacts the outer surface of the electronic cable when the cable section attaches to the electronic cable, the cable contact surface having a cable section radius which substantially mirrors a radius of the outer surface of the electronic cable;
   wherein the rigid label surface defined by the label section is flatter than the cable section radius of the cable contact surface defined by the cable section; and
   wherein electronic data communications signals are allowed to pass through the electronic cable when the cable section attaches to the electronic cable.

3. A cable assembly as in claim 2 wherein the cable section and the label section are arranged to form a substantially cylindrical structure which encircles the outer surface of the electronic cable when the cable section attaches to the electronic cable.

4. A label supporter, comprising:
  a cable section arranged to attach to an electronic cable; and
  a label section arranged to interact with the cable section, the label section defining a rigid label surface which concurrently (i) overlays a portion of an outer surface of the electronic cable at a predefined distance from the outer surface of the electronic cable and (ii) supports a label at the predefined distance from the outer surface of the electronic cable when the cable section attaches to the electronic cable;
  wherein the cable section defines a cable contact surface which contacts the outer surface of the electronic cable when the cable section attaches to the electronic cable, the cable contact surface having a cable section radius which substantially mirrors a radius of the outer surface of the electronic cable;
  wherein the rigid label surface defined by the label section is flatter than the cable section radius of the cable contact surface defined by the cable section;
  wherein the cable section includes an inner component which is arranged to fasten to the electronic cable in a substantially stationary manner when the cable section attaches to the electronic cable; and
  wherein the label section includes an outer component which is arranged to rotate around the inner component when the outer component is installed around the inner component and when the cable section attaches to the electronic cable.

5. A label supporter as in claim 4 wherein the rigid label surface defined by the label section has a label section radius which is larger than the cable section radius of the cable contact surface defined by the cable section.

6. A label supporter as in claim 4 wherein the rigid label surface defined by the label section is substantially flat to support the label substantially in a plane.

7. A label supporter as in claim 4 wherein the cable section and the label section are arranged to form a substantially cylindrical structure which encircles the outer surface of the electronic cable when the cable section attaches to the electronic cable.

8. A label supporter as in claim 7 wherein the inner component includes:
  a first member,
  a second member, and
  a hinge which connects the first member to the second member, the first member, the second member, and the hinge belonging to an integrated, unitary body.

9. A label supporter as in claim 8
  wherein the inner component further includes a protrusion which is arranged to protrude into the outer surface of the electronic cable toward a center axis of the electronic cable when the cable section attaches to the electronic cable.

10. A label supporter as in claim 9 wherein an end of the protrusion is arranged to grab the outer surface of the electronic cable to prevent the label supporter from sliding lengthwise along the electronic cable while concurrently allow the label supporter to rotate around the electronic cable when the cable section attaches to the electronic cable.

11. A label supporter as in claim 8 wherein the integrated, unitary body is a single injection molded plastic part from an injection molding process.

12. A label supporter as in claim 11 wherein the first and second members are arranged to lock with each other in a snap fit manner when the first and second members fold about the hinge toward each other to form the substantially cylindrical structure which encircles the outer surface of the electronic cable.

13. A label supporter as in claim 12 wherein the first and second members are further arranged to unlock from each other in response to screwdriver actuation applied between the first and second members.

14. A label supporter as in claim 4 wherein the rigid label surface defined by the label section has a height which is greater than a diameter of the electronic cable, a width which is substantially greater than the height, and a thickness which is the predefined distance.

15. A label supporter as in claim 14 wherein the width of the rigid label surface is measured along a direction which is substantially parallel to a center axis of the electronic cable when the cable section attaches to the electronic cable.

16. A label supporter as in claim 14 wherein the label section further defines a lip which extends substantially around a periphery of the rigid label surface to recess the label when the rigid label surface supports the label.

17. A label supporter as in claim 4 wherein the inner component of the cable section defines outer ridges which prevent the outer component of the label section from sliding off of the inner component when the inner component is installed around the outer component.

18. A label supporter as in claim 17 wherein each of the inner component and the outer component has a clamshell-style, hinged structure which forms a cylinder around the electronic cable when properly installed.

19. A label supporter as in claim 4 wherein the inner component defines a substantially cylindrical-shaped cavity with a circular cross-section.

20. A label supporter, comprising:
  a cable section arranged to attach to an electronic cable; and
  a label section arranged to interact with the cable section, the label section defining a rigid label surface which concurrently (i) overlays a portion of an outer surface of the electronic cable at a predefined distance from the outer surface of the electronic cable and (ii) supports a label at the predefined distance from the outer surface of the electronic cable when the cable section attaches to the electronic cable;
  wherein the cable section includes an inner component which is arranged to fasten to the electronic cable in a substantially stationary manner when the cable section attaches to the electronic cable; and
  wherein the label section includes an outer component which is arranged to rotate around the inner component when the outer component is installed around the inner component and when the cable section attaches to the electronic cable.

* * * * *